C. S. ASH.
QUICK DETACHABLE VEHICLE WHEEL HUB.
APPLICATION FILED AUG. 6, 1919.
1,382,881.
Patented June 28, 1921.
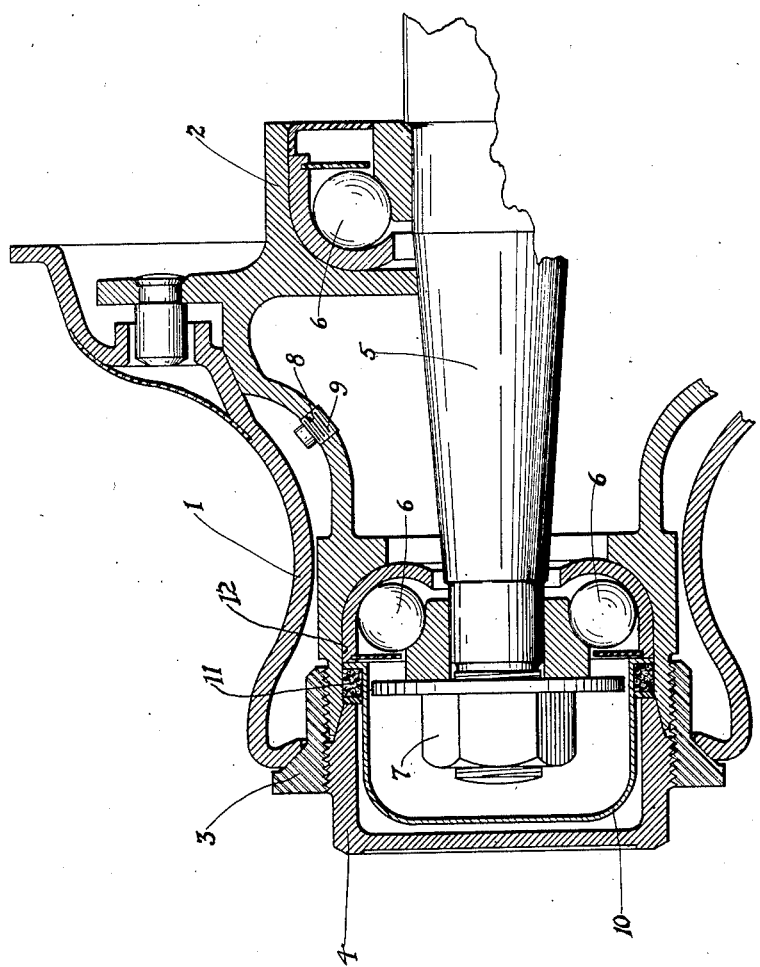

UNITED STATES PATENT OFFICE.

CHARLES S. ASH, OF HAGERSTOWN, MARYLAND.

QUICK-DETACHABLE-VEHICLE-WHEEL HUB.

1,382,881. Specification of Letters Patent. Patented June 28, 1921.

Application filed August 6, 1919. Serial No. 315,590.

*To all whom it may concern:*

Be it known that I, CHARLES S. ASH, a citizen of the United States, residing at Hagerstown, in the county of Washington and State of Maryland, have invented certain new and useful Improvements in Quick-Detachable-Vehicle-Wheel Hubs, of which the following is a full, clear, and exact description, such as will enable others skilled in the art to which it appertains to make and use the same.

This invention relates to wheel hubs, and more particularly to an improved construction of inner hubs for quick detachable vehicle wheels and associated parts.

It is a primary object of the invention to provide a simple and practicable construction and association of parts whereby the inner hub of a quick detachable vehicle wheel may be packed with a lubricant, which is retained independently of the outer hub and its locking mechanism.

It is a further object to provide a construction for the purpose mentioned which is structurally superior and functionally advantageous.

Other objects and advantages will be in part noted hereinafter in connection with the following description of the accompanying drawing, which illustrates a partial sectional view of a preferred embodiment of the invention.

Referring more particularly to the drawing, there is shown a quick detachable vehicle wheel, including an outer hub 1 telescopically fitted over an inner hub 2 and secured against relative axial displacement on the latter by a retaining ring 3 and a locking cap 4. To detach the outer hub and parts carried thereby, the locking cap 4 may be slightly loosened and then removed as a unit with the retaining ring 3 by unscrewing the latter.

The inner hub 2 is preferably of the shape shown and may be mounted on axle 5 through the medium of bearings 6 and a nut 7 on the threaded end of the axle.

Especially for wheels mounted on a non-driving, or steering, axle, it is desirable to pack the inner hub 2 with a heavy lubricant, such as grease. In the present instance there is provided an opening 8 through the body of the inner hub and a threaded closure 9 therefor, and through this opening grease may be injected to the interior of the hub. In order to prevent leakage of the grease with its attendant objection when the quick detachable wheel is removed, there is provided a grease-retaining cap 10, which may be of thin metal and has secured thereto a felt or other washer 11 at its inner end, such washer snugly fitting the interior bore 12 of the outer end of the hub 2 when the cap 10 is positioned.

It will be observed that the grease-retaining cap is effectually prevented from displacement by the locking cap 4 when the wheel is mounted. Furthermore, the engagement between the washer 11 and the inner hub 2 is sufficient to retain these parts against accidental displacement during the interval that the detachable wheel is not in position. The cap 10 does not interfere with the detachment of the wheel, and if it is desired also to remove the inner hub 2 from the axle, the cap is capable of ready withdrawal to give access to the nut 7 on axle 5.

Having described my invention, what I claim as new and desire to secure by Letters Patent is:

In a quick detachable wheel, in combination, an axle, an inner hub secured thereto, an outer hub telescoping on said inner hub, threaded means screwing on said inner hub and engaging said outer hub to hold the latter, and a cap having a washer slidably fitting within the outer end of said inner hub to retain a lubricant therein, said threaded means and said outer hub being removable independently of said cap and said cap being removable independently of said threaded means and said outer hub.

In testimony whereof I affix my signature, in the presence of two witnesses.

CHARLES S. ASH.

Witnesses:
H. WATSON,
M. A. CASHIN.